(12) United States Patent
Kim (10) Patent No.: US 9,740,604 B2
(45) Date of Patent: Aug. 22, 2017

(54) METHOD FOR ALLOCATING STORAGE SPACE USING BUDDY ALLOCATOR

(71) Applicant: ELECTRONICS AND TELECOMMUNICATIONS RESEARCH INSTITUTE, Daejeon (KR)

(72) Inventor: Chei Yol Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/073,875

(22) Filed: Mar. 18, 2016

(65) Prior Publication Data

US 2016/0275009 A1    Sep. 22, 2016

(30) Foreign Application Priority Data

Mar. 20, 2015   (KR) .................. 10-2015-0039022

(51) Int. Cl.
G06F 12/02    (2006.01)
(52) U.S. Cl.
CPC .... G06F 12/023 (2013.01); *G06F 2212/1044* (2013.01)
(58) Field of Classification Search
CPC .................................................. G06F 12/023
USPC ................................................ 711/171, 170
See application file for complete search history.

(56) References Cited

U.S. PATENT DOCUMENTS

| 7,610,468 | B2 | 10/2009 | Madisetti |
| 8,793,464 | B2* | 7/2014 | Schreter .............. G06F 12/0284 711/170 |
| 2004/0107314 | A1 | 6/2004 | Kim et al. |
| 2010/0161585 | A1 | 6/2010 | Jin et al. |
| 2013/0232315 | A1* | 9/2013 | Tian ................... G06F 12/0284 711/170 |

(Continued)

OTHER PUBLICATIONS https://en.wikipedia.org/wiki/Buddy_memory_allocation, Author unknown, downloaded May 1, 2017, pp. 1-3.*

(Continued)

*Primary Examiner* — Stephen Elmore
(74) *Attorney, Agent, or Firm* — Kile Park Reed & Houtteman PLLC (57) ABSTRACT

Provided herein a method for allocating storage space using a buddy allocator, the method including receiving, by a buddy allocator, a block allocation request from a space allocation requestor, selecting, by the buddy allocator, a first buddy in response to the block allocation request, wherein the first buddy is one of a plurality of buddies, checking, by the buddy allocator, whether blocks of the first buddy include a first spare storage space to which storage space corresponding to the block allocation request is allocated, allocating, by the buddy allocator, the storage space to the blocks of the first buddy when it is checked that the blocks of the first buddy include the first spare storage space, and deallocating, by the buddy allocator, excess storage space of allocated storage space when a size of the allocated storage space is greater than the storage corresponding to the block allocation request, wherein the excess storage space is not corresponding to the block allocation request.

9 Claims, 5 Drawing Sheets

(56) References Cited

U.S. PATENT DOCUMENTS

2014/0201490 A1* 7/2014 Yoo ...................... G06F 12/023
                                                              711/170

OTHER PUBLICATIONS web.cs.ucdavis.edu/~pandey/Teaching/ECS150/Lects/06memory.pdf, "Memory Management", Raju Pandey, Department of Computer Sciences, University of California, Davis, Spring 2011, pp. 24-29.*

* cited by examiner

FIG. 3C

METHOD FOR ALLOCATING STORAGE SPACE USING BUDDY ALLOCATOR

CROSS-REFERENCE TO RELATED APPLICATION

The present application claims priority to Korean patent application number 10-2015-0039022 filed on Mar. 20, 2015, the entire disclosure of which is incorporated herein in its entirety by reference.

BACKGROUND

Field of Invention

Various embodiments of the inventive concept of the present disclosure relate to a method for allocating storage space using a buddy allocator, and more particularly, to a method for allocating storage space using a buddy allocator by allocating storage space to blocks of a buddy in response to a block allocation request, and deallocating storage space from a block corresponding to excess storage space not being used.

Description of Related Art

A storage device, such as a memory or a disk, generally manages storage space in units of blocks having a predetermined size for efficient space utilization. To store data in the storage device, an allocation algorithm for allocating storage space of a size desired by a user and retrieving the allocated storage space may be used. In addition, the storage device may use an allocation algorithm for allocating storage space according to blocks in units of multiples. These allocation algorithms may significantly affect system performance.

An allocation manager based on units of blocks may be referred to as a block allocator. A buddy allocator, which is one of the block allocators, may be widely used to efficiently allocate storage space in a memory device. The buddy allocator may be used for allocation of a block device, such as a disk, as well as a memory. A block device allocator may manage allocation and deallocation of disk blocks in a file system.

The basic allocator of the buddy allocator is a binary buddy allocator. The binary buddy allocator may allocate $2^n$ blocks (where n is zero or a positive integer). In other words, when there is a request for allocating three blocks, four blocks are allocated since $2^2$ is the lowest value including the number three. However, storage space allocation using this binary buddy allocator may cause internal fragmentation.

SUMMARY

Various embodiments of the present disclosure provide a method for allocating storage space of a buddy allocator which can reduce internal fragmentation by deallocating storage space allocated to an unused block generated during allocation of storage space by a binary buddy allocator without physical changes to a device, and newly allocating the deallocated storage space in response to another block allocation request.

According to an embodiment, there is provided a method for allocating storage space using a buddy allocator, the method including receiving, by a buddy allocator, a block allocation request from a space allocation requestor, selecting, by the buddy allocator, a first buddy in response to the block allocation request, wherein the first buddy is one of a plurality of buddies, checking, by the buddy allocator, whether blocks of the first buddy include a first spare storage space to which storage corresponding to the block allocation request is allocated, and allocating the storage space corresponding to the block allocation request to the blocks of the first buddy when it is checked that the blocks of the first buddy include the first spare storage space, and deallocating, by the buddy allocator, excess storage space not corresponding to the block allocation request from allocated storage space when a size of the storage space of the allocated storage space is greater than the storage space corresponding to the block allocation request.

The selecting of the first buddy may include calculating, by the buddy allocator, difference values between sizes of blocks of the plurality of buddies and the size of the storage space of the block allocation request, and selecting, by the buddy allocator, a buddy having a smallest difference value as the first buddy, from buddies including blocks having greater sizes than the size of the block allocation request, among the plurality of buddies.

The allocating of the storage space may include checking, by the buddy allocator, whether blocks of a second buddy include a second spare storage space to which the storage space corresponding to the block allocation request is allocated when the blocks of the first buddy do not include the first spare storage space, and transferring, by the buddy allocator, the second spare storage space from the blocks of the second buddy to the blocks of the first buddy when the blocks of the second buddy include the second spare storage space, to allocate the storage space corresponding to the block allocation request to the blocks of the first buddy.

The allocating of the storage space may include checking, by the buddy allocator, whether blocks of a third buddy include a third spare storage space to which the storage space corresponding to the block allocation request is allocated when the blocks of the second buddy do not include the second spare storage space, and transferring, by the buddy allocator, the third spare storage space from the blocks of the third buddy to the blocks of the second buddy when the blocks of the third buddy include the third spare storage space, and transferring the storage space corresponding to the first spare storage space from the blocks of the second buddy to the blocks of the first buddy to allocate the storage space corresponding to the block allocation request.

The blocks of the first buddy and the blocks of the second buddy may satisfy A×B=C×D, where A is a size of the blocks of the first buddy, B is a number of blocks of the first buddy, C is a size of the blocks of the second buddy, and D is a number of blocks of the second buddy.

A size of the blocks of the second buddy may be two times greater than a size of the blocks of the first buddy, and a size of the blocks of the third buddy is two times greater than the size of the blocks of the second buddy.

The plurality of buddies may include 2n blocks to which the storage space is allocated, where n is a natural number.

The method may further include deallocating, by the buddy allocator, all storage spaces allocated to the plurality of buddies when receiving an initialization command, and setting, by the buddy allocator, blocks of a buddy including a largest block to an allocable state.

The method may further include transferring, by the buddy allocator, an allocation failure to the space allocation requestor when none of the blocks of the plurality of buddies include the storage space corresponding to the block allocation request.

BRIEF DESCRIPTION OF THE DRAWINGS

Example embodiments will now be described more fully hereinafter with reference to the accompanying drawings.

however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Specific structural or functional descriptions of exemplary embodiments in accordance with a concept of the present invention which are disclosed in this specification are illustrated only to describe the exemplary embodiments in accordance with the concept of the present invention and the exemplary embodiments in accordance with the concept of the present invention may be carried out by various forms but the present invention is not limited to the exemplary embodiments described in this specification.

Various modifications and changes may be applied to the exemplary embodiments in accordance with the concept of the present invention so that the exemplary embodiments will be illustrated in the drawings and described in detail in the specification. However, the exemplary embodiments according to the concept of the present invention is not limited to the specific embodiments, but includes all changes, equivalents, or alternatives which are included in the spirit and technical scope of the present invention.

Terminologies such as first or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. On the contrary, it should be understood that when an element is referred to as being "directly connected to" or "directly coupled to" another element, another element does not intervene therebetween. Other expressions which describe the relationship between components, that is, "between" and "directly between", or "adjacent to" and "directly adjacent to" need to be interpreted by the same manner.

Terminologies used in the present specification are used only to describe specific exemplary embodiments, and are not intended to limit the present invention. A singular form may include a plural form if there is no clearly opposite meaning in the context. In the present specification, it should be understood that terms "include" or "have" indicate that a feature, a number, a step, an operation, a component, a part or the combination those of described in the specification is present, but do not exclude a possibility of presence or addition of one or more other features, numbers, steps, operations, components, parts or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if they are not clearly defined in this specification.

Figure 1A:
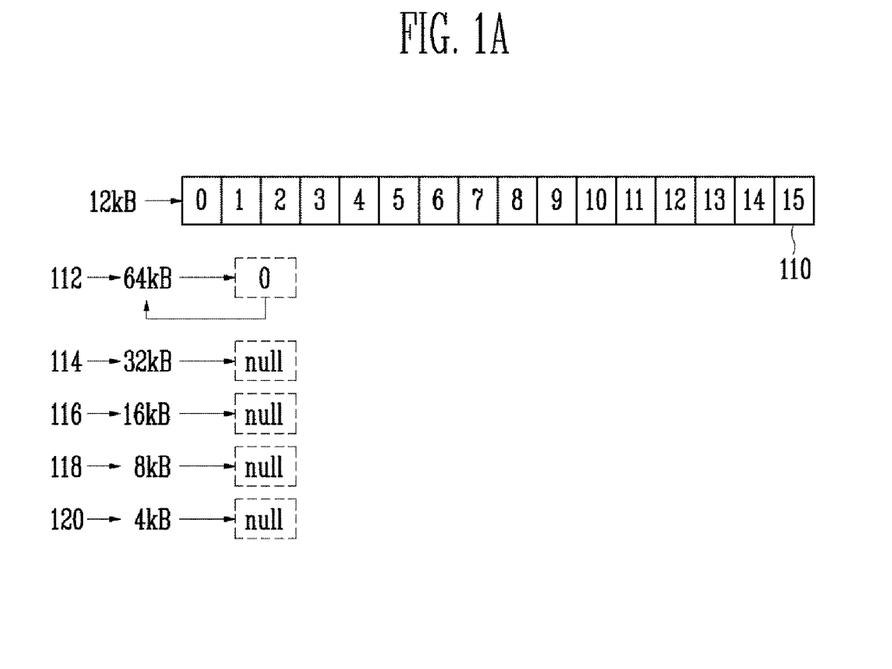
FIGS. 1A, 1B and 1C are conceptual diagrams illustrating a method for allocating storage space by a binary buddy allocator according to an embodiment of the present disclosure.
Figure 1B:
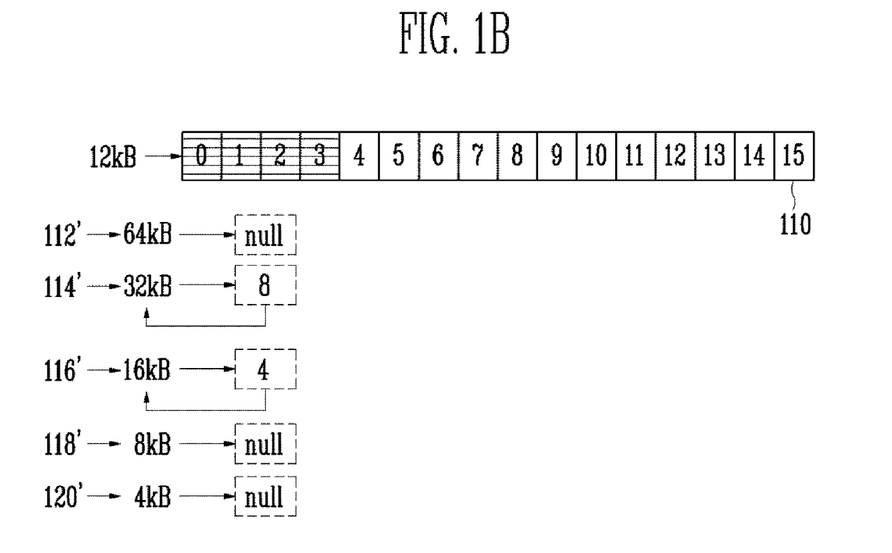
Figure 1C:
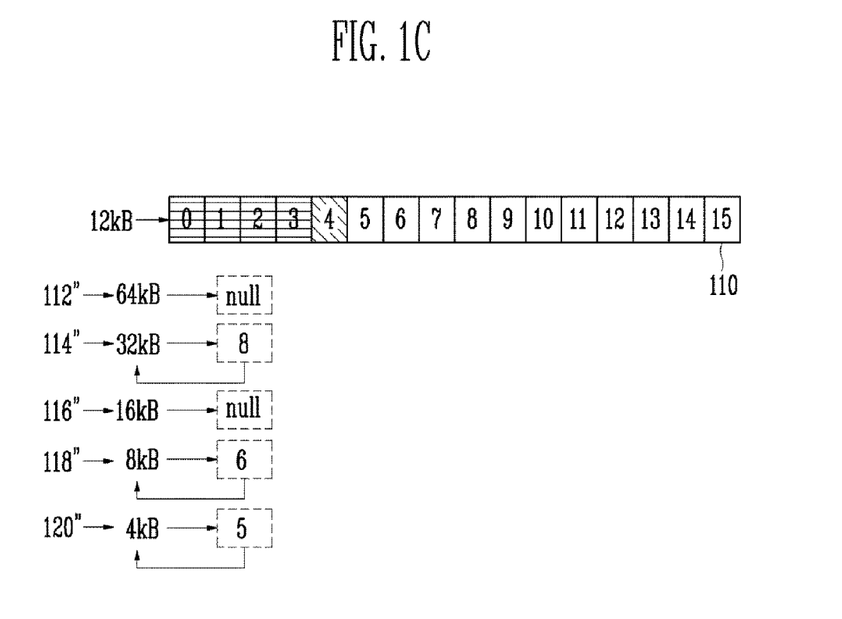

FIGS. 1A, 1B and 1C are conceptual diagrams illustrating a method for allocating storage space by a binary buddy allocator according to an embodiment.

Operations for processing a storage space allocation request with respect to blocks 110 having a total storage space of 64 KB, each block having a size of 4 KB, are illustrated with reference to FIGS. 1A to 1C.

When a single block has a size of 4 KB, the binary buddy allocator may allocate blocks of a size corresponding to multiplications of 4 KB and $2^n$ (n is 0 or a natural number). For example, the binary buddy allocator may maintain buddy lists of 4 KB, 8 KB, 16 KB, 32 KB, and 64 KB Each of the blocks 110 shown in FIG. 1A may show an initialization state so that each of the blocks can be allocated.

For example, the blocks 110 may include allocable storage space of 64 KB, and the binary buddy allocator may allocate a free buddy block 112 of 64 KB to a block having an address '0'. However, the binary buddy allocator may not allocate any storage space to the blocks 110 since the remaining buddy lists 114, 116, 118, and 120 include 'null'.

When the blocks 110 receive a block allocation request for a block size of, e.g., 12 KB, three blocks may be required for allocation since each block has a size of 4 KB. However, since the binary buddy allocator allocates data to $2^n$ blocks, the binary buddy allocator may allocate data to $2^2=4$ blocks (16 KB) including the three blocks.

The binary buddy allocator may not allocate storage space to the blocks 110 since a buddy list 116' of 16 KB includes 'null'.

The binary buddy allocator may transfer the block allocation request from the buddy list 116' of 16 KB to a buddy list 114' of 32 KB. However, since the buddy list 114' of 32 KB also includes 'null', the binary buddy allocator may transfer the block allocation request to an upper buddy list 112' of 64 KB.

Referring to FIG. 1B, the binary buddy allocator may change a free buddy block of the buddy list 112' of 64 KB to 'null' and transfer allocable storage space to the buddy list 114' of 32 KB.

The binary buddy allocator may transfer half (32 KB) of the allocable storage space of the buddy list 114' of 32 KB to the buddy list 116' of 16 KB and change the buddy list 114' to a free buddy block of 32 KB including the blocks 110 in which the first block has an address of '8' by using the remaining storage space. In other words, the buddy list 114' of 32 KB may include the allocable storage space corresponding to the blocks 110 in which the first block has the address of '8'.

The binary buddy allocator may allocate storage space to part of the allocable storage space of 32 KB of the buddy list 116' of 16 KB in response to the block allocation request. In other words, the binary buddy allocator may allocate the storage space corresponding to the block allocation request to the blocks 110 corresponding to addresses '0' to '3', and change the remaining allocable storage space to a free buddy block of 16 KB of the buddy list 116' of 16 KB including the blocks 110 corresponding to addresses '4' to '7'.

Since the block size of 12 KB corresponds to the block allocation request and three blocks (the blocks 110 corresponding to addresses '0' to '2') each having a block size of 4 KB are to be allocated, the binary buddy allocator can allocate blocks corresponding to multiplications of 4 KB and $2^n$, four blocks (blocks 110 having addresses '0' to '3) may be allocated instead of three.

Referring to FIGS. 1B and 1C, the binary buddy allocator may newly allocate storage space of 4 KB to the blocks 110 in response to a new block allocation request.

As described above, since a buddy list 120" of 4 KB includes 'null', the buddy list 120" may receive allocable storage space from an upper buddy list.

In other words, a buddy list 118" of 8 KB may receive allocable storage space from a buddy list 116" of 16 KB, and the binary buddy allocator may transfer half of allocable storage space of the buddy list 118" of 8 KB to the buddy list 120" of 4 KB. The binary buddy allocator may change the remaining allocable storage space to a free buddy block of 8 KB including the blocks 110 in which the first block has an address of '6'.

In addition, the buddy list 120" of 4 KB may allocate half (4 KB) of the allocable storage space transferred from the buddy list 118" of 8 KB in response to the new block allocation request, and change the remaining allocable storage space to a free buddy block of 4 KB including the blocks 110 in which the first block has an address of '5'.

Therefore, although data is not actually allocated to the block 110 having the address of '3', this block may be an unusable, abandoned block due to the characteristics of the binary buddy allocator.

Figure 2:
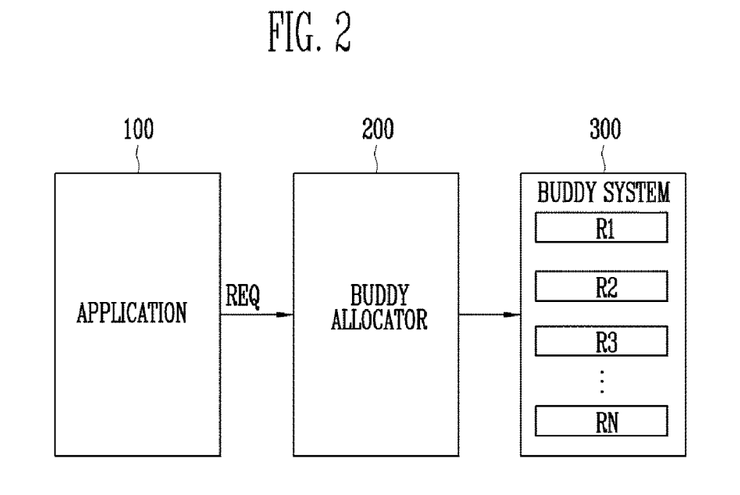
FIG. 2 is a schematic block diagram illustrating a system for allocating storage space according to an embodiment of the present disclosure.

FIG. 2 is a schematic block diagram illustrating a storage allocation system 10 according to an embodiment.

Referring to FIG. 2, the storage allocation system 10 may include an application 100, a buddy allocator 200 and a buddy system 300.

The application 100 may transfer a block allocation request REQ to the buddy allocator 200. The application 100 may be a host, e.g., a program executed on a CPU, an application processor, or the like.

The buddy allocator 200 may be a block allocation algorithm and allocate storage space to the buddy system 300 in response to the block allocation request REQ of the application 100. For example, the buddy allocator 200 may be a program executed on a CPU, an application processor, or the like.

The buddy allocator 200 may check a size of necessary storage space in response to the block allocation request REQ from the application 100 and allocate the storage space to a plurality of buddies R1, R2, R3, . . . , and Rn to the buddy system 300.

When the buddy allocator 200 receives the block allocation request REQ from the application 100, the buddy allocator 200 may compare a size of each of the blocks of the plurality of buddies R1, R2, R3, . . . , and Rn with a size corresponding to the block allocation request and select a buddy to allocate the storage space, among the plurality of buddies R1, R2, R3, . . . , and Rn, according to a result of the comparison.

The buddy allocator 200 may check whether blocks of the selected buddy include spare storage space to which storage space is allocated, and allocate the storage space to the blocks of the selected buddy when the spare storage space exists.

The buddy allocator 200 may deallocate a block corresponding to a difference between a size of the allocated storage space of the blocks of the selected buddy and the size of the block allocation request. In other words, the buddy allocator 200 may deallocate the block corresponding to the above difference to prevent internal fragmentation.

According to an embodiment, when the buddy allocator 200 receives an initialization command, the buddy allocator 200 may deallocate all storage spaces allocated to the blocks of the plurality of buddies and set blocks of a buddy including the largest block to an allocable state.

The buddy system 300 may include the plurality of buddies R1, R2, R3, . . . , and Rn. The buddy allocator 200 may allocate storage space to the plurality of buddies R1, R2, R3, . . . , and Rn included in the buddy system 300 in response to the block allocation request REQ.

Figure 3A:
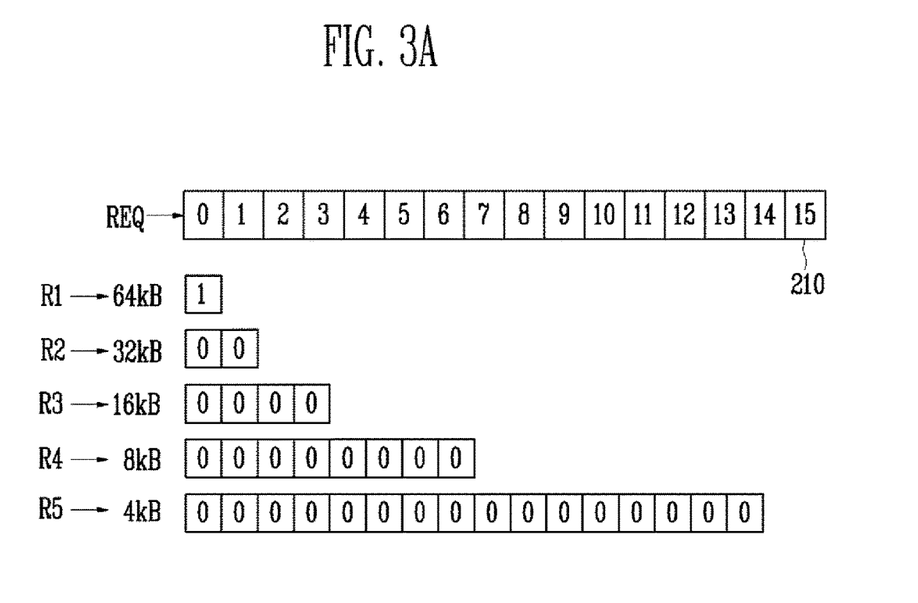
FIGS. 3A, 3B and 3C are conceptual diagrams illustrating a method for allocating storage space using a buddy allocator according to an embodiment of the present disclosure.
Figure 3B:
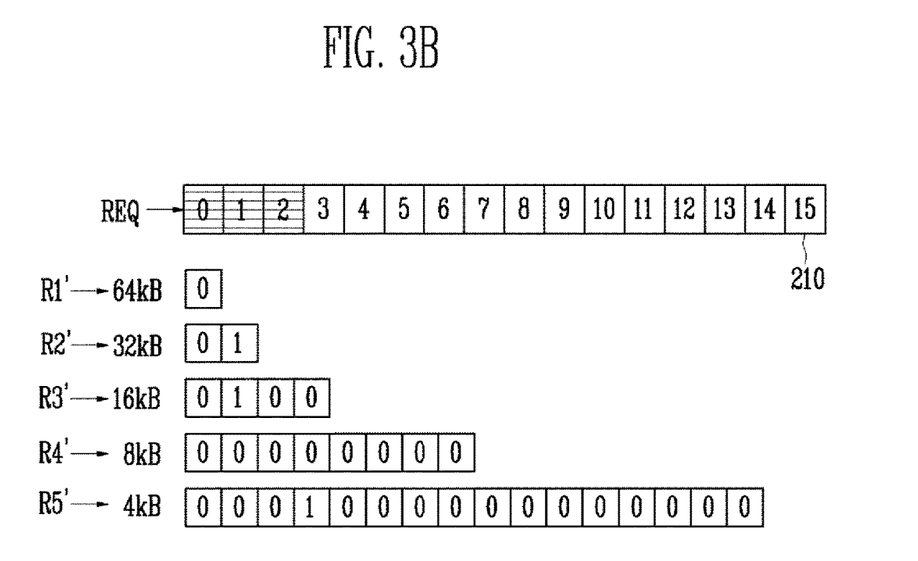
Figure 3C:
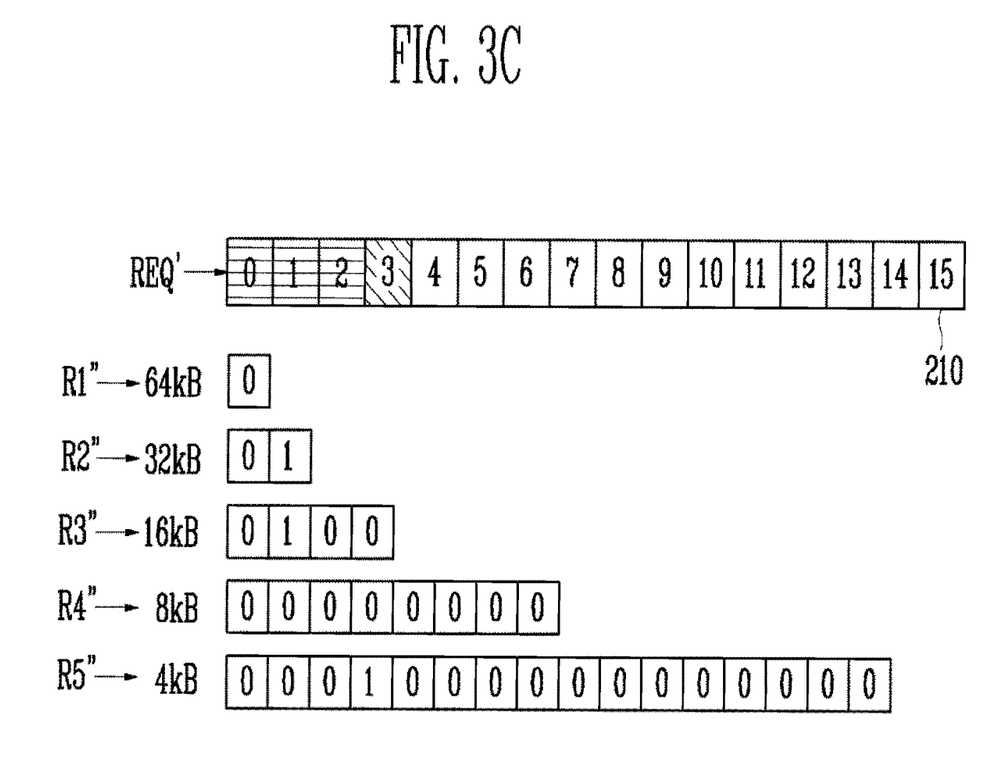

FIGS. 3A, 3B, and 3C are conceptual diagrams illustrating a method for allocating storage space using a buddy allocator according to an embodiment.

Referring to FIGS. 2, 3A, 3B, and 3C, the buddy allocator 200 may use the plurality of buddies R1, R2, R3, R4, and R5 to allocate storage space in response to the block allocation request REQ.

For convenience of explanation, it is assumed that blocks 210 may consist of sixteen blocks having addresses from '0' to '15' and each of the blocks may have a size of 4 KB. However, the present invention is not limited thereto.

Blocks of the plurality of buddies R1, R2, R3, R4, and R5 may have sizes corresponding to multiplications of 4 KB and $2^n$. For example, the plurality of buddies may be divided into the buddy R1 of 64 KB, the buddy R2 of 32 KB, the buddy R3 of 16 KB, the buddy R4 of 8 KB and the buddy R5 of 4 KB.

$$A \times B = C \times D \qquad \text{[Equation 1]}$$

In Equation 1, A may be a block size of a first buddy which is one of the plurality of buddies R1, R2, R3, R4, and R5; B may be the number of blocks of the first buddy; C may be a block size of a second buddy different from the first buddy, among the plurality of buddies R1, R2, R3, R4, and R5; and D may refer to the number of blocks of the second buddy.

The blocks of the plurality of the plurality of buddies R1, R2, R3, R4, and R5 may have the same size as each other.

For example, the buddy R1 of 64 KB may include one block, and the buddy R5 of 4 KB may include sixteen blocks. In other words, the buddy R1 of 64 KB and the buddy R5 of 4 KB may satisfy Equation 1 (64 KB×1=4 KB×16).

The blocks of each of the plurality of buddies R1, R2, R3, R4, and R5 may include '0' or '1'. A block including '0' may be in a state where data corresponding to a size of the corresponding block is not allocated to storage space of the corresponding block, i.e., the space of the corresponding block may be filled. A block including '1' may be in a state where data corresponding to a size of the corresponding block is allocated to storage space of the corresponding block, i.e., the storage space of the corresponding block may be empty.

For example, when the single block included in the buddy R1 of 64 KB includes '1', the block may have storage space of 64 KB to allocate.

For example, when four blocks of the buddy R3 of 16 KB include '1', '1', '0', and '0', respectively, there may be two blocks to each of which storage space of 16 KB is allocated.

According to an embodiment, when the buddy allocator 200 receives the block allocation request REQ from the application 100, the buddy allocator 200 may compare differences between sizes of the blocks of the plurality of buddies R1, R2, R3, R4, and R5 and the size corresponding to the block allocation request REQ, and select a buddy having the smallest difference as a first buddy, from buddies including blocks with a greater size than the size of the block allocation request, among the plurality of buddies R1, R2, R3, R4, and R5, according to a result of the comparison.

For example, when the block allocation request REQ has a size of 12 KB, the buddy allocator 200 may select the buddy R3 of 16 KB as the first buddy, among the buddy R1 of 64 KB, the buddy R2 of 32 KB and the buddy R3 of 16 KB which are greater than 12 KB.

The buddy allocator 200 may check whether the selected first buddy includes a first spare storage space to which storage space corresponding to the block allocation request REQ is allocated.

For example, when the buddy allocator 200 receives the block allocation request REQ for the size of 12 KB, the buddy allocator 200 may check whether blocks of the buddy R3 of 16 KB include the first spare storage space.

In other words, the buddy allocator 200 may check whether the blocks of the buddy R3 of 16 KB include the first spare storage space by determining whether at least one of the blocks of the buddy R3 of 16 KB includes '1'.

Referring to FIG. 3A, the buddy allocator 200 may determine that the buddy R3 of 16 KB does not include allocable storage space since each of the blocks thereof includes '0'.

The buddy allocator 200 may check whether blocks of a second buddy which are greater than the blocks of the first buddy include a second spare storage space to which the storage space of 12 KB corresponding to the block allocation request REQ is allocated when the blocks of the first buddy do not include the first spare storage space.

For example, the buddy allocator 200 may check whether the blocks of the buddy R2 of 32 KB include the second spare storage space to which the storage space of 12 KB corresponding to the block allocation request REQ is allocated since the blocks of the buddy R3 of 16 KB do not include the first spare storage space.

The buddy allocator 200 may check whether blocks of a third buddy which are greater than the blocks of the second buddy include a third spare storage space to which the storage space of 12 KB corresponding to the block allocation request REQ is allocated when the blocks of the second buddy do not include the second spare storage space.

For example, since the blocks of the buddy R2 of 32 KB do not include the second spare storage space, the buddy allocator 200 may check whether the blocks of the buddy R1 of 64 KB include the third spare storage space to which the storage space corresponding to the block allocation request REQ is allocated. The buddy allocator 200 may determine that allocable storage space exits since the block of the buddy R1 of 64 KB includes '1'.

According to an embodiment, the buddy allocator 200 may request an allocation failure to the application 100 when the blocks of the plurality of buddies R1, R2, R3, R4, and R5 do not include a spare storage space to which the storage space of 12 KB corresponding to the block allocation request REQ is allocated.

Referring to FIG. 3B, the buddy allocator 200 may transfer the third spare storage space of the third buddy to the second spare storage space of the second buddy.

For example, the buddy allocator 200 may transfer a spare storage space of a buddy R1' of 64 KB to a spare storage space of a buddy R2' of 32 KB, so that the block of the buddy R1' of 64 KB may be changed to include '0' and all blocks of the buddy R2' of 32 KB may be changed to include '1'. As a result, each of the blocks of the buddy R2' of 32 KB may be allocated storage space of 32 KB.

In addition, the buddy allocator 200 may transfer half of the spare storage space of the blocks of the buddy R2' of 32 KB to a spare storage space of a buddy R3' of 16 KB. One of the two blocks of the buddy R2' of 32 KB may be changed to include '0' and the other block may be changed to include '1', so that two of the blocks of the buddy R3' of 16 KB may be changed to include '1'.

The buddy allocator 200 may allocate the storage space corresponding to the block allocation request REQ to the blocks of the buddy R3' of 16 KB. For example, the buddy allocator 200 may allocate the storage space corresponding to the block allocation request REQ to one of the blocks of the buddy R3' of 16 KB.

Since the block allocation request REQ is made for the size of 12 KB and one block has a size of 16 KB, the buddy allocator 200 may allocate the storage space to one of the blocks of the buddy R3' of 16 KB. The block of the buddy R3' of 16 KB to which the storage space is allocated may be changed to include '0', and the allocated storage space may be allocated to a region indicated by addresses '0' to '3' of the blocks 210.

In other words, although the size of the storage space for which the application 100 requests the buddy allocator 200 is 12 KB, since the buddy allocator 200 allocates storage space having a size corresponding to multiplications of 16 KB and $2^n$, the buddy allocator 200 may allocate storage space of 16 KB which is greater than the requested storage space size by 4 KB.

The buddy allocator 200 may provide the allocated storage space of 16 KB corresponding to one of the blocks of the buddy R3' of 16 KB to the application 100. As a result, the application 100 may write data into the allocated storage space of 16 KB, and internal fragmentation may occur due to the storage space of 4 KB which does not correspond to an initial allocation target.

The buddy allocator 200 may deallocate excess storage space which is not included in the initial allocation target. In other words, the buddy allocator 200 may calculate a difference value between the block size of the first buddy and the storage space size corresponding to the block allocation request REQ and deallocate the storage space corresponding to the difference value.

For example, the buddy allocator 200 may deallocate storage space corresponding to a difference of 4 KB between the block size of the buddy R3' of 16 KB and the size of the block allocation request REQ. Thus, the buddy allocator 200 may deallocate the storage space allocated to the address '3' in the blocks 210.

Referring to FIG. 3C, the buddy allocator 200 may transfer the deallocated storage space to a buddy including a block having a storage space size corresponding to the difference.

For example, the buddy allocator 200 may transfer the deallocated storage space (4 KB) of the blocks 210 of the buddy R3' of 16 KB to the fourth block of a buddy R5" of 4 KB, and the fourth block of the buddy R5" of 4 KB may be changed to include '1' and set to an allocable state.

After the buddy allocator 200 allocates the storage space having the size of 12 KB, the buddy allocator 20 may receive a new block allocation request REQ'.

The buddy allocator 200 may select the buddy R5" of 4 KB including a block having the same size as that of the new block allocation request REQ' as a first buddy.

Since the fourth block of the buddy R5" of 4 KB includes '1', the buddy allocator 200 may allocate storage space corresponding to the new block allocation request REQ' to the fourth block.

As set forth above, the buddy allocator 200 according to an embodiment may transfer the storage space of 4 KB, which is not used due to internal fragmentation, to the buddy R5" of 4 KB in response to the block allocation request REQ, and may newly allocate the storage space transferred to the buddy R5" of 4 KB in response to the new block allocation request REQ'. Therefore, the buddy allocator 200 may reduce internal fragmentation caused by the conventional binary buddy allocator.

Figure 4:
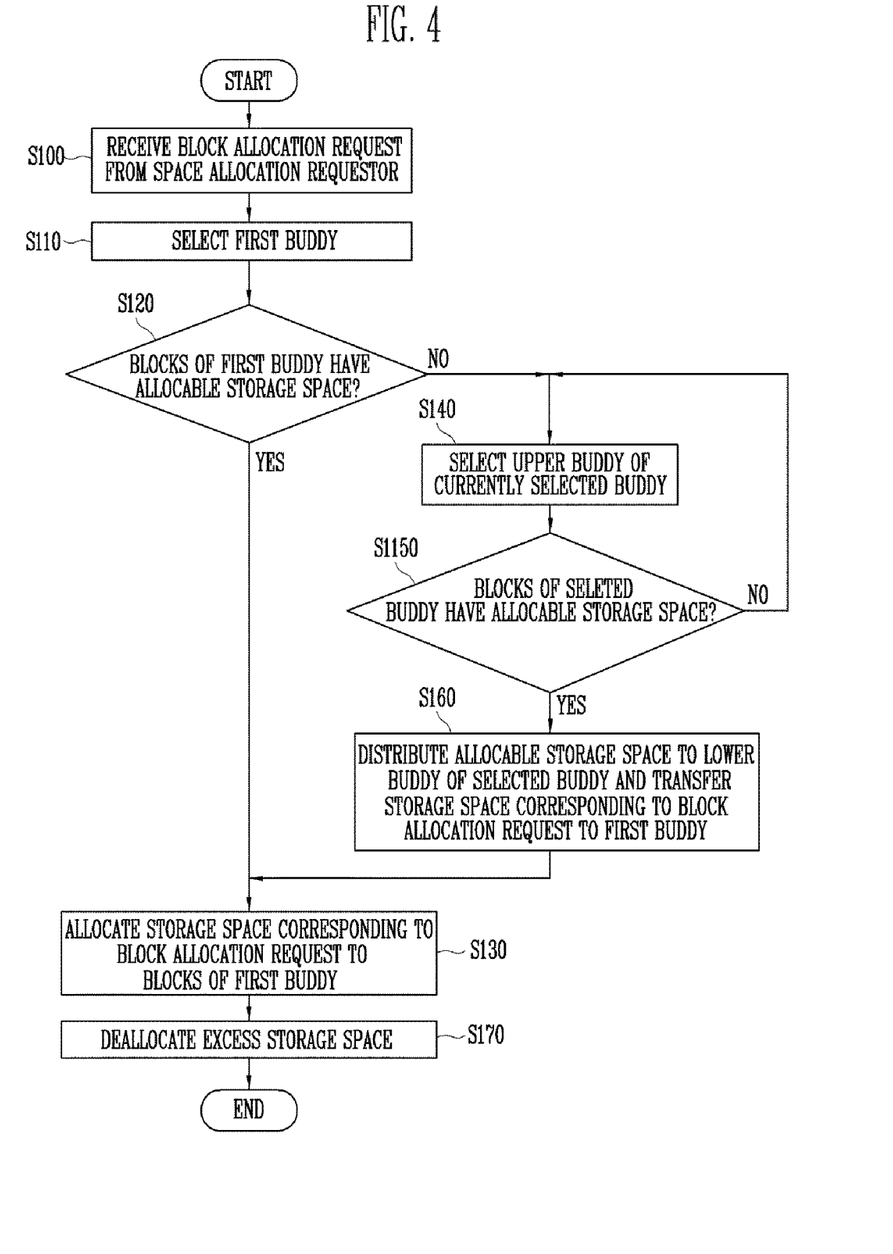
FIG. 4 is a flowchart illustrating a method for allocating storage space using a buddy allocator according to an embodiment of the present disclosure.

FIG. 4 is a flowchart illustrating a method for allocating storage space using a buddy allocator according to an embodiment.

Referring to FIGS. 2, 3A, 3B, 3C and 4, the buddy allocator 200 may receive the block allocation request REQ from the application 100 (S100) and select a buddy having a block size closest to a size of the block allocation request REQ as a first buddy, among the plurality of buddies R1, R2, R3, . . . , and Rn (S110).

The buddy allocator 200 may check whether blocks of the first buddy include a first spare storage space to which storage space corresponding to the block allocation request REQ is allocated (S120).

When the blocks of the first buddy include a first spare storage space, the buddy allocator 200 may allocate storage space corresponding to the block allocation request REQ (S130).

When the blocks of the first buddy do not include the first spare storage space, the buddy allocator 200 may select an upper buddy of the currently selected buddy (S140). In other words, the buddy allocator 200 may select a second buddy which is an upper buddy of the first buddy, and a block size of the second buddy may be two times greater than that of the first buddy.

The buddy allocator 200 may check whether blocks of the selected buddy, e.g., blocks of the second buddy include a second spare storage space to which the storage space corresponding to the block allocation request REQ is allocated (S150).

When the blocks of the selected buddy include the second spare storage space, the buddy allocator 200 may distribute the second spare storage space to allocate to a lower buddy of the selected buddy and transfer the storage space corresponding to the block allocation request REQ to the first buddy (S160).

For example, when the blocks of the second buddy include the second spare storage space, the buddy allocator 200 may transfer the second spare storage space to the first spare storage space (S160) and allocate the storage space corresponding to the block allocation request REQ to the blocks of the first buddy (S130).

According to an embodiment, when blocks of a third buddy of an upper buddy of the second buddy include an allocable third spare storage space, the buddy allocator 200 may transfer the third spare storage space of the third buddy to the second spare storage space of the second buddy and transfer the storage space corresponding to the block allocation request REQ to the first spare storage space. In other words, the remaining storage space, except for the storage space corresponding to the block allocation request REQ, may be included in the second buddy as the second spare storage space.

When the blocks of the second buddy do not include the second spare storage space, an upper buddy of the current buddy may be selected again, and it may be determined whether blocks of the newly selected buddy include a spare storage space to allocate (S150).

Finally, when the size of the allocated space is greater than that of the block allocation request REQ, the buddy allocator 200 may deallocate excess space which does not correspond to the block allocation request REQ from the allocated storage space (S170).

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A method for allocating storage space using a buddy allocator, the method comprising:
   receiving, by a buddy allocator, a block allocation request from a space allocation requestor;
   selecting, by the buddy allocator, a first buddy in response to the block allocation request, wherein the first buddy is one of a plurality of buddies;
   checking, by the buddy allocator, whether blocks of the first buddy include a first spare storage space to which storage space corresponding to the block allocation request is allocated;
   allocating, by the buddy allocator, the storage space to the blocks of the first buddy when it is checked that the blocks of the first buddy include the first spare storage space; and
   deallocating, by the buddy allocator, excess storage space of allocated storage space when a size of the allocated storage space is greater than the storage space corresponding to the block allocation request, wherein the excess storage space is not corresponding to the block allocation request.

2. The method of claim 1, wherein the selecting of the first buddy comprises:
   calculating, by the buddy allocator, difference values between sizes of blocks of the plurality of buddies and the size of the block allocation request, and
   selecting, by the buddy allocator, a buddy having a smallest difference value as the first buddy, from buddies including blocks having greater sizes than the size of the block allocation request, among the plurality of buddies.

3. The method of claim 1, wherein the allocating of the storage comprises:
checking, by the buddy allocator, whether blocks of a second buddy include a second spare storage space to which the storage space corresponding to the block allocation request is allocated when the blocks of the first buddy do not include the first spare storage space, and
transferring, by the buddy allocator, the second spare storage space from the blocks of the second buddy to the blocks of the first buddy when the blocks of the second buddy include the second spare storage space, to allocate the storage space corresponding to the block allocation request to the blocks of the first buddy.

4. The method of claim 3, wherein the allocating of the storage comprises:
checking, by the buddy allocator, whether blocks of a third buddy include a third spare storage space to which the storage space corresponding to the block allocation request is allocated when the blocks of the second buddy do not include the second spare storage space, and
transferring, by the buddy allocator, the third spare storage space from the blocks of the third buddy to the blocks of the second buddy when the blocks of the third buddy include the third spare storage space, and transferring the storage space corresponding to the first spare storage space from the blocks of the second buddy to the blocks of the first buddy to allocate the storage space corresponding to the block allocation request.

5. The method of claim 3, wherein the blocks of the first buddy and the blocks of the second buddy satisfy $A \times B = C \times D$,
where A is a size of the blocks of the first buddy, B is a number of blocks of the first buddy, C is a size of the blocks of the second buddy, and D is a number of blocks of the second buddy.

6. The method of claim 4, wherein a size of the blocks of the second buddy is two times greater than a size of the blocks of the first buddy, and a size of the blocks of the third buddy is two times greater than the size of the blocks of the second buddy.

7. The method of claim 1, wherein the plurality of buddies include $2^n$ blocks to which the storage is allocated, where n is a natural number.

8. The method of claim 1, further comprising:
deallocating, by the buddy allocator, all storage stage spaces allocated to the plurality of buddies when receiving an initialization command, and
setting, by the buddy allocator, blocks of a buddy including a largest block to an allocable state.

9. The method of claim 1, further comprising transferring, by the buddy allocator, an allocation failure to the space allocation requestor when none of the blocks of the plurality of buddies include the storage space corresponding to the block allocation request.

* * * * *